US009269360B2

(12) United States Patent
McGrath

(10) Patent No.: US 9,269,360 B2
(45) Date of Patent: Feb. 23, 2016

(54) USING MULTICHANNEL DECORRELATION FOR IMPROVED MULTICHANNEL UPMIXING

(75) Inventor: David Stanley McGrath, Sydney (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 683 days.

(21) Appl. No.: 13/519,313

(22) PCT Filed: Jan. 7, 2011

(86) PCT No.: PCT/US2011/020561
§ 371 (c)(1), (2), (4) Date: Jun. 26, 2012

(87) PCT Pub. No.: WO2011/090834
PCT Pub. Date: Jul. 28, 2011

(65) Prior Publication Data
US 2012/0321105 A1 Dec. 20, 2012

Related U.S. Application Data

(60) Provisional application No. 61/297,699, filed on Jan. 22, 2010.

(51) Int. Cl.
*H04B 1/00* (2006.01)
*G10L 19/008* (2013.01)

(52) U.S. Cl.
CPC .................................... *G10L 19/008* (2013.01)

(58) Field of Classification Search
CPC .................. G10L 19/00; G10L 19/008; G10L 2019/0005; G10L 2019/0006; G10L 2019/0009; G10L 2019/001; G10L 2019/0016; G10L 19/02; G10L 19/0204; G10L 19/0208; G10L 19/0212; G10L 2021/02082; H04B 1/00; H04M 9/082; H04R 3/005; H04R 1/406
USPC ......... 381/1, 2, 10, 13, 15, 17, 18, 20, 22, 23, 381/61, 63, 77, 80, 107, 106, 104, 119, 120, 381/302, 56, 57, 58; 700/94
See application file for complete search history.

(56) References Cited

U.S. PATENT DOCUMENTS 8,284,961 B2 * 10/2012 Miyasaka et al. ............. 381/119
8,705,757 B1 * 4/2014 Betbeder ......................... 381/63
2009/0092259 A1 4/2009 Jot

FOREIGN PATENT DOCUMENTS

CN ZL03817877.X 9/2005
CN 1898943 1/2007

(Continued)

OTHER PUBLICATIONS

Jot et al, "Spatial Enhancement of Audio Recordings", AES 23rd International Conference, Copenhagen, Denmark, May 23-25, 2003, p. 1-11.*

(Continued)

*Primary Examiner* — Leshui Zhang

(57) ABSTRACT

A system of linear equations is used to upmix a number N of audio signals to generate a larger number M of audio signals that are psychoacoustically decorrelated with respect to one another and that can be used to improve the representation of a diffuse sound field. The linear equations are defined by a matrix that specifies a set of vectors in an M dimensional space that are substantially orthogonal to each other. Methods for deriving the system of linear equations are disclosed.

14 Claims, 3 Drawing Sheets

(56) References Cited

FOREIGN PATENT DOCUMENTS

| | | |
|---|---|---|
| EP | 1897084 | 3/2008 |
| EP | 2137725 | 12/2009 |
| JP | 2006-005414 | 1/2006 |
| JP | 4700467 | 3/2006 |
| JP | 4603037 | 11/2007 |
| JP | 2009-501948 | 1/2009 |
| JP | 2010-507943 | 3/2010 |
| RU | 2010152580 | 6/2012 |
| WO | 2005-101370 | 10/2005 |
| WO | 2007/013775 | 2/2007 |
| WO | 2007/081166 | 7/2007 |
| WO | 2008/153944 | 12/2008 |
| WO | 2008/049587 | 4/2009 |

OTHER PUBLICATIONS

Hotho, G. et al "Multichannel Coding of Applause Signals" EURASIP Journal on Advances in Signal Processing, vol. 55, No. 10, Jan. 1, 2008, p. 331.

Jot, J.M., et al., "Spatial Enhancement of Audio Recordings" AES 60, New York, May 23, 2003.

Seefeldt, A., et al., "New Techniques in Spatial Audio Coding" AES, New York, Oct. 7, 2005, Chapter 4.

Hwan, S., et al., "Stereo Music Source Separation for 3-D Upmixing" AES Convention, New York, Oct. 2009.

Gundry, Kenneth, "A New Active Matrix Decoder for Surround Sound", AES 19th International Conference, May 2001, pp. 2-9.

* cited by examiner

USING MULTICHANNEL DECORRELATION FOR IMPROVED MULTICHANNEL UPMIXING

CROSS-REFERENCE TO RELATED APPLICATIONS

This application claims priority to U.S. Provisional Patent Application No. 61/297,699 filed 22 Jan. 2010 which is hereby incorporated by reference in its entirety.

TECHNICAL FIELD

The present invention pertains generally to signal processing for audio signals and pertains more specifically to signal processing techniques that may be used to generate audio signals representing a diffuse sound field. These signal processing techniques may be used in audio applications like upmixing, which derives some number of output channel signals from a smaller number of input channel signals.

BACKGROUND ART

The present invention may be used to improve the quality of audio signals obtained from upmixing; however, the present invention may be used advantageously with essentially any application that requires one or more audio signals representing a diffuse sound field. More particular mention is made of upmixing applications in the following description.

A process known as upmixing derives some number M of audio signal channels from a smaller number N of audio signal channels. For example, audio signals for five channels designated as left (L), right (R), center (C), left-surround (LS) and right-surround (RS) can be obtained by upmixing audio signals for two input channels designated here as left-input ($L_i$) and right input ($R_i$). One example of an upmixing device is the Dolby® Pro Logic® II decoder described in Gundry, "A New Active Matrix Decoder for Surround Sound," 19th AES Conference, May 2001. An upmixer that uses this particular technology analyzes the phase and amplitude of two input signal channels to determine how the sound field they represent is intended to convey directional impressions to a listener. Depending on the desired artistic effect of the input audio signals, the upmixer should be capable of generating output signals for five channels to provide the listener with the sensation of one or more aural components having apparent directions within an enveloping diffuse sound field having no apparent direction. The present invention is directed toward generating output audio signals for one or more channels that can create through one or more acoustic transducers a diffuse sound field with higher quality.

Audio signals that are intended to represent a diffuse sound field should create an impression in a listener that sound is emanating from many if not all directions around the listener. This effect is opposite to the well-known phenomenon of creating a phantom image or apparent direction of sound between two loud speakers by reproducing the same audio signal through each of those loud speakers. A high-quality diffuse sound field typically cannot be created by reproducing the same audio signal through multiple loud speakers located around a listener. The resulting sound field has widely varying amplitude at different listening locations, often changing by large amounts for very small changes in location. It is not uncommon that certain positions within the listening area seem devoid of sound for one ear but not the other. The resulting sound field seems artificial.

DISCLOSURE OF INVENTION

It is an object of the present invention to provide audio signal processing techniques for deriving two or more channels of audio signals that can be used to produce a higher-quality diffuse sound field through acoustic transducers such as loud speakers.

According to one aspect of the present invention, M output signals are derived from N input audio signals for presentation of a diffuse sound field, where M is greater than N and is greater than two. This is done by deriving K intermediate audio signals from the N input audio signals such that each intermediate signal is psychoacoustically decorrelated with the N input audio signals and, if K is greater than one, is psychoacoustically decorrelated with all other intermediate signals. The N input audio signals and the K intermediate signals are mixed to derive the M output audio signals according to a system of linear equations with coefficients of a matrix that specify a set of N+K vectors in an M-dimensional space. At least K of the N+K vectors are substantially orthogonal to all other vectors in the set. The quantity K is greater than or equal to one and is less than or equal to M−N.

According to another aspect of the present invention, a matrix of coefficients for a system of linear equations is obtained for use in mixing N input audio signals to derive M output audio signals for presentation of a diffuse sound field. This is done by obtaining a first matrix having coefficients that specify a set of N first vectors in an M-dimensional space; deriving a set of K second vectors in the M-dimensional space, each second vector being substantially orthogonal to each first vector and, if K is greater than one, to all other second vectors; obtaining a second matrix having coefficients that specify the set of K second vectors; concatenating the first matrix with second matrix to obtain an intermediate matrix having coefficients that specify a union of the set of N first vectors and the set of K second vectors; and preferably scaling the coefficients of the intermediate matrix to obtain a signal processing matrix having a Frobenius norm within 10% of the Frobenius norm of the first matrix, wherein the coefficients of the signal processing matrix are the coefficients of the system of linear equations.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

A. Introduction

Figure 1:
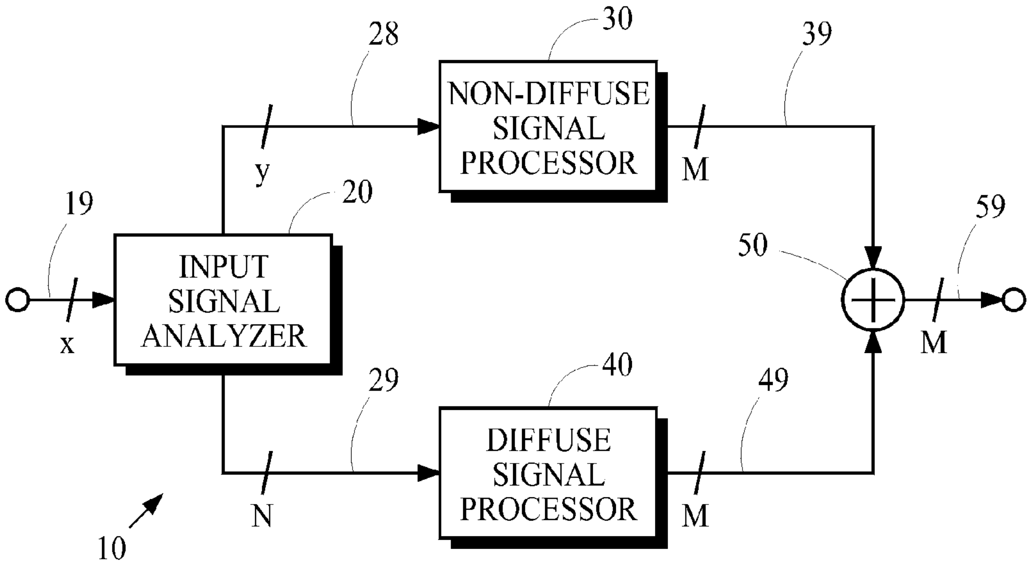
FIG. 1 is a schematic block diagram of an audio signal processing device that may incorporate aspects of the present invention.

FIG. 1 is a schematic block diagram of a device 10 that may incorporate aspects of the present invention. The device 10 receives audio signals for one or more input channels from the signal path 19 and generates audio signals along the signal path 59 for a plurality of output channels. The small line that crosses the signal path 19 as well as the small lines that cross the other signal paths indicate these signal paths carry signals for one or more channels. The symbols N and M immediately below the small crossing lines indicate the various signal paths carry signals for N and M channels, respectively. The symbols x and y immediately below some of the small crossing lines indicate the respective signal paths carry an unspecified number of signals that is not important for the purpose of understanding the present invention.

In the device 10, the input signal analyzer 20 receives audio signals for one or more input channels from the signal path 19 and analyzes them to determine what portions of the input signals represent a diffuse sound field and what portions represent a sound field that is not diffuse. A diffuse sound field creates an impression in a listener that sound is emanating from many if not all directions around the listener. A non-diffuse sound field creates an impression that sound is emanating from a particular direction or from a relatively narrow range of directions. The distinction between diffuse and non-diffuse sound fields is subjective and may not always be definite. Although this may affect the performance of practical implementations that employ aspects of the present invention, it does not affect the principles underlying the present invention.

The portions of the input audio signals that are deemed to represent a non-diffuse sound field are passed along the signal path 28 to the non-diffuse signal processor 30, which generates along the signal path 39 a set of M signals that are intended to reproduce the non-diffuse sound field through a plurality of acoustic transducers such as loud speakers. One example of an upmixing device that performs this type of processing is a Dolby Pro Logic II decoder, mentioned above.

The portions of the input audio signals that are deemed to represent a diffuse sound field are passed along the signal path 29 to the diffuse signal processor 40, which generates along the signal path 49 a set of M signals that are intended to reproduce the diffuse sound field through a plurality of acoustic transducers such as loud speakers. The present invention is directed toward the processing performed in the diffuse signal processor 40.

The summing component 50 combines each of the M signals from the non-diffuse signal processor 30 with a respective one of the M signals from the diffuse signal processor 40 to generate an audio signal for a respective one of the M output channels. The audio signal for each output channel is intended to drive an acoustic transducer such as a loud speaker.

The present invention is directed toward developing and using a system of linear mixing equations to generate a set of audio signals that can represent a diffuse sound field. These mixing equations may be used in the diffuse signal processor 40, for example. The remainder of this disclosure assumes the number N is greater than or equal to one, the number M is greater than or equal to three, and the number M is greater than the number N.

The device 10 is merely one example of how the present invention may be used. The present invention may be incorporated into other devices that differ in function or structure from what is illustrated in FIG. 1. For example, the signals representing both the diffuse and non-diffuse portions of a sound field may be processed by a single component. A few implementations for a distinct diffuse signal processor 40 are described below that mix signals according to a system of linear equations defined by a matrix. Various parts of the processes for both the diffuse signal processor 40 and the non-diffuse signal processor 30 could be implemented by a system of linear equations defined by a single matrix. Furthermore, aspects of the present invention may be incorporated into a device without also incorporating the input signal analyzer 20, the non-diffuse signal processor 30 or the summing component 50.

B. First Derivation Method

The diffuse signal processor 40 generates along the path 49 a set of M signals by mixing the N channels of audio signals received from the path 29 according to a system of linear equations. For ease of description in the following discussion, the portions of the N channels of audio signals received from the path 29 are referred to as intermediate input signals and the M channels of intermediate signals generated along the path 49 are referred to as intermediate output signals. This mixing operation includes the use of a system of linear equations that may be represented by a matrix multiplication as shown in expression 1:

$$\vec{Y} = \begin{bmatrix} Y_1 \\ \vdots \\ Y_M \end{bmatrix} = \begin{bmatrix} C_{1,1} & \cdots & C_{1,N+K} \\ \vdots & \ddots & \vdots \\ C_{M,1} & \cdots & C_{M,N+K} \end{bmatrix} \cdot \begin{bmatrix} X_1 \\ \vdots \\ X_{N+K} \end{bmatrix} = C \cdot \vec{X} \quad (1)$$

$$\text{for } 1 \le K \le (M-N)$$

where $\vec{X}$=column vector representing N+K signals obtained from the N intermediate input signals;

C=M×(N+K) matrix or array of mixing coefficients; and $\vec{Y}$=column vector representing the M intermediate output signals.

The mixing operation may be performed on signals represented in the time domain or frequency domain. The following discussion makes more particular mention of time-domain implementations.

If desired, the same system of linear mixing equations can be expressed by transposing the vectors and matrix as follows:

$$\vec{Y}^T = \vec{X}^T \cdot C^T \quad (2)$$

where $\vec{X}^T$=row vector representing the N+K signals obtained from the N intermediate input signals;

$C^T$=(N+K)×M transposition of the matrix C; and $\vec{Y}^T$=row vector representing the M intermediate output signals.

The following description uses notations and terminology such as rows and columns that are consistent with expression 1; however, the principles of the present invention may be derived and applied using other forms or expressions such as expression 2 or an explicit system of linear equations.

As shown in expression 1, K is greater than or equal to one and less than or equal to the difference (M−N). As a result, the number of signals $X_i$ and the number of columns in the matrix C is between N+1 and M.

The coefficients of the matrix C may be obtained from a set of N+K unit-magnitude vectors in an M-dimensional space that are "substantially orthogonal" to one another. Two vectors are considered to be substantially orthogonal to one another if their dot product is less than 35% of a product of their magnitudes. This corresponds to an angle between vectors from about seventy degrees to about 110 degrees. Each column in the matrix C may have M coefficients that correspond to the elements of one of the vectors in the set. For example, the coefficients that are in the first column of the matrix C correspond to one of the vectors V in the set whose elements are denoted as $(V_1, \ldots, V_M)$ such that $C_{1,1}=p\cdot V_1, \ldots, C_{M,1}=p\cdot V_M$, where p is a scale factor used to scale the matrix coefficients as may be desired. Alternatively, the coefficients in each column j of the matrix C may be scaled by different scale factors $p_j$. In many applications, the coefficients are scaled so that the Frobenius norm of the matrix is equal to or within 10% of $\sqrt{N}$. Additional aspects of scaling are discussed below.

The set of N+K vectors may be derived in any way that may be desired. One method creates an M×M matrix G of coefficients with pseudo-random values having a Gaussian distribution, and calculates the singular value decomposition of this matrix to obtain three M×M matrices denoted here as U, S and V. The U and V matrices are both unitary matrices. The C matrix can be obtained by selecting N+K columns from either the U matrix or the V matrix and scaling the coefficients in these columns to achieve a Frobenius norm equal to or within 10% of $\sqrt{N}$. A preferred method that relaxes some of the requirements for orthogonality is described below.

The N+K input signals are obtained by decorrelating the N intermediate input signals with respect to each other. The type of decorrelation that is desired is referred to herein as "psychoacoustic decorrelation." Psychoacoustic decorrelation is less stringent than numerical decorrelation in that two signals may be considered psychoacoustically decorrelated even if they have some degree of numerical correlation with each other.

The numerical correlation of two signals can be calculated using a variety of known numerical algorithms. These algorithms yield a measure of numerical correlation called a correlation coefficient that varies between negative one and positive one. A correlation coefficient with a magnitude equal to or close to one indicates the two signals are closely related. A correlation coefficient with a magnitude equal to or close to zero indicates the two signals are generally independent of each other.

Psychoacoustical correlation refers to correlation properties of audio signals that exist across frequency subbands that have a so-called critical bandwidth. The frequency-resolving power of the human auditory system varies with frequency throughout the audio spectrum. The human ear can discern spectral components closer together in frequency at lower frequencies below about 500 Hz but not as close together as the frequency progresses upward to the limits of audibility. The width of this frequency resolution is referred to as a critical bandwidth and, as just explained, it varies with frequency.

Two signals are said to be psychoacoustically decorrelated with respect to each other if the average numerical correlation coefficient across psychoacoustic critical bandwidths is equal to or close to zero. Psychoacoustic decorrelation is achieved if the numerical correlation coefficient between two signals is equal to or close to zero at all frequencies. Psychoacoustic decorrelation can also be achieved even if the numerical correlation coefficient between two signals is not equal to or close to zero at all frequencies if the numerical correlation varies such that its average across each psychoacoustic critical band is less than half of the maximum correlation coefficient for any frequency within that critical band.

Psychoacoustic decorrelation can be achieved using delays or special types of filters, which are described below. In many implementations, N of the N+K signals $X_i$ can be taken directly from the N intermediate input signals without using any delays or filters to achieve psychoacoustic decorrelation because these N signals represent a diffuse sound field and are likely to be already psychoacoustically decorrelated.

C. Improved Derivation Method

If the signals generated by the diffuse signal processor 40 are combined with other signals representing a non-diffuse sound field such as is shown in FIG. 1, for example, the resulting combination of signals may generate undesirable artifacts if the matrix C is designed using the method described above. These artifacts may result because the design of the matrix C did not account for possible interactions between the diffuse and non-diffuse portions of a sound field. As mentioned above, the distinction between diffuse and non-diffuse is not always definite and the input signal analyzer 20 may generate signals along the path 28 that represent a diffuse sound field to some degree and may generate signals along the path 29 that represent a non-diffuse sound field to some degree. If the diffuse signal generator 40 destroys or modifies the non-diffuse character of the sound field represented by the signals on the path 29, undesirable artifacts or audible distortions may occur in the sound field that is produced from the output signals generated along the path 59. For example, if the sum of the M diffuse processed signals on the path 49 with the M non-diffuse processed signals on the path 39 causes cancellation of some non-diffuse signal components, this may degrade the subjective impression that would otherwise be achieved by use of the present invention.

An improvement may be achieved by designing the matrix C to account for the non-diffuse nature of the sound field that is processed by the non-diffuse signal processor 30. This can be done by first identifying a matrix E that either represents or is assumed to represent the encoding processing that processes M channels of audio signals to create the N channels of input audio signals received from the path 19, and then deriving an inverse of this matrix as discussed below.

One example of a matrix E is a 5×2 matrix that is used to downmix five channels, L, C, R, LS, RS, into two channels denoted as left-total ($L_T$) and right total ($R_T$). Signals for the $L_T$ and $R_T$ channels are one example of the input audio signals for two (N=2) channels that are received from the path 19. In this example, the device 10 may be used to synthesize five (M=5) channels of output audio signals that can create a sound field that is perceptually similar if not identical to the sound field that could have been created from the original five audio signals.

One exemplary 5×2 matrix E that may be used to encode $L_T$ and $R_T$ channel signals from the L, C, R, LS and RS channel signals is shown in the following expression:

$$E = \begin{bmatrix} 1 & \frac{\sqrt{2}}{2} & 0 & \frac{\sqrt{3}}{2} & \frac{-1}{2} \\ 0 & \frac{\sqrt{2}}{2} & 1 & \frac{-1}{2} & \frac{\sqrt{3}}{2} \end{bmatrix} \quad (3)$$

An M×N pseudoinverse matrix B can usually be derived from the N×M matrix E using known numerical techniques including those implemented in numerical software such as the "pinv" function in Matlab®, available from The MathWorks™, Natick, Mass., or the "PseudoInverse" function in Mathematica®, available from Wolfram Research, Champaign, Ill. The matrix B may not be optimum if its coefficients create unwanted crosstalk between any of the channels, or if any coefficients are imaginary or complex numbers. The matrix B can be modified to remove these undesirable characteristics. It can also be modified to achieve any desired artistic effect by changing the coefficients to emphasize the signals for selected loudspeakers. For example, coefficients can be changed to increase the energy in signals destined for play back through loudspeakers for left and right channels and to decrease the energy in signals destined for play back through the loudspeaker for the center channel. The coefficients in the matrix B are scaled so that each column of the matrix represents a unit-magnitude vector in an M-dimensional space. The vectors represented by the columns of the matrix B do not need to be substantially orthogonal to one another.

On exemplary 5×2 matrix B is shown in the following expression:

$$B = \begin{bmatrix} 0.65 & 0 \\ 0.40 & 0.40 \\ 0 & 0.65 \\ 0.60 & -0.24 \\ -0.24 & 0.60 \end{bmatrix} \quad (4)$$

This matrix may be used to generate a set of M intermediate output signals from the N intermediate input signals by the following operation:

$$\vec{Y} = B \cdot \vec{X} \quad (5)$$

Figure 2:
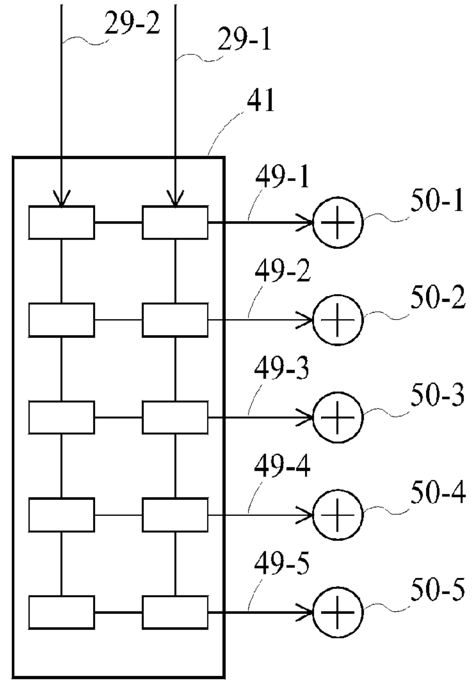
FIG. 2 is a schematic illustration of a base upmixing matrix.

This operation is illustrated schematically in FIG. 2. A mixer 41 receives the N intermediate input signals from the signal paths 29-1 and 29-2 and mixes these signals according to a system of linear equations to generate a set of M intermediate output signals along the signal paths 49-1 to 49-5. The boxes within the mixer 41 represent signal multiplication or amplification by coefficients of the matrix B according to the system of linear equations.

Although the matrix B can be used alone, performance is improved by using an additional M×K augmentation matrix A, where $1 \le K \le (M-N)$. Each column in the matrix A represents a unit-magnitude vector in an M-dimensional space that is substantially orthogonal to the vectors represented by the N columns of the B matrix. If K is greater than one, each column represents a vector that is also substantially orthogonal to the vectors represented by all other columns in the matrix A.

The vectors for the columns of the matrix A may be derived in essentially any way that may be desired. The techniques mentioned above may be used. A preferred method is described below.

Coefficients in the augmentation matrix A and the matrix B may be scaled as explained below and concatenated to produce the matrix C. The scaling and concatenation may be expressed algebraically as:

$$C = [\beta \cdot B | \alpha \cdot A] \quad (6)$$

where |=horizontal concatenation of the columns of matrix B and matrix A;

α=scale factor for the matrix A coefficients; and

β=scale factor for the matrix B coefficients.

For many applications, the scale factors α and β are chosen so that the Frobenius norm of the composite matrix C is equal to or within 10% of the Frobenius norm of the matrix B. The Frobenius norm of the matrix C may be expressed as:

$$\|C\|_F = \sqrt{\Sigma_i \Sigma_j |c_{ij}|^2}$$

where $c_{ij}$=matrix coefficient in row i and column j.

If each of the N columns in the matrix B and each of the K columns in the matrix A represent a unit-magnitude vector, the Frobenius norm of the matrix B is equal to $\sqrt{N}$ and the Frobenius norm of the matrix A is equal to $\sqrt{K}$. For this case, it can be shown that if the Frobenius norm of the matrix C is to be set equal to $\sqrt{N}$, then the values for the scale factors α and β are related to one another as shown in the following expression:

$$\alpha = \sqrt{\frac{N \cdot (1 - \beta^2)}{K}} \quad (7)$$

After setting the value of the scale factor β, the value for the scale factor α can be calculated from expression 7. Preferably, the scale factor β is selected so that the signals mixed by the coefficients in columns of the matrix B are given at least 5 dB greater weight than the signals mixed by coefficients in columns of the augmentation matrix A. A difference in weight of at least 6 dB can be achieved by constraining the scale factors such that $\alpha < 1/2\beta$. Greater or lesser differences in scaling weight for the columns of the matrix B and the matrix A may be used to achieve a desired acoustical balance between audio channels.

Alternatively, the coefficients in each column of the augmentation matrix A may be scaled individually as shown in the following expression:

$$C = [\beta \cdot B | \alpha_1 \cdot A_1 \ \alpha_2 \cdot A_2 \ldots \alpha_K \cdot A_K] \quad (8)$$

where $A_j$=column j of the augmentation matrix A; and $\alpha_j$=the respective scale factor for column j.

For this alternative, we may choose arbitrary values for each scale factor $\alpha_j$ provided that each scale factor satisfies the constraint $\alpha_j < 1/2\beta$. Preferably, the values of the αj and β coefficients are chosen to ensure the Frobenius norm of C is approximately equal to the Frobenius norm of the matrix B.

Figure 3:
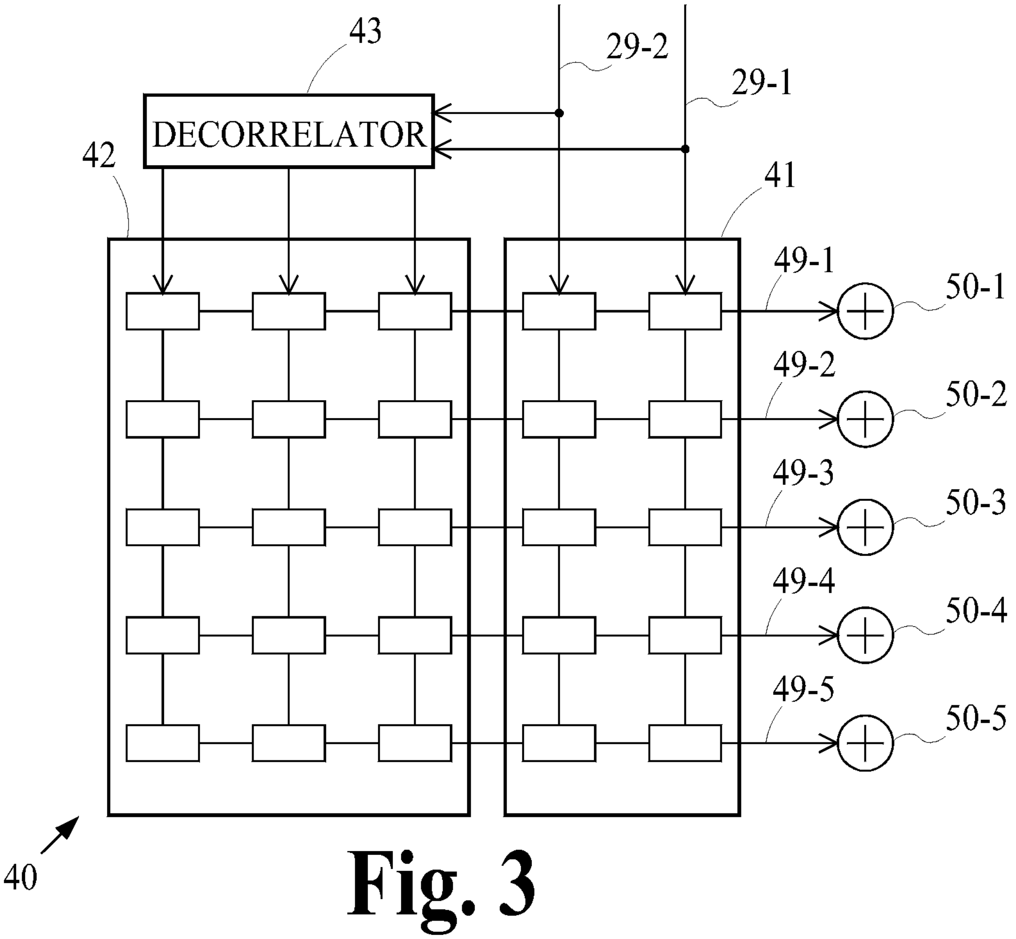
FIG. 3 is a schematic illustration of a base upmixing matrix concatenated with an augmentation upmixing matrix.

Each of the signals that are mixed according to the augmentation matrix A are processed so that they are psychoacoustically decorrelated from the N intermediate input signals and from all other signals that are mixed according to the augmentation matrix A. This is illustrated schematically in FIG. 3, which shows by example two (N=2) intermediate input signals, five (M=5) intermediate output signals and three (K=3) decorrelated signals mixed according to the augmentation matrix A. In this example, the two intermediate input signals are mixed according to the basic inverse matrix B, represented by the box 41, and they are decorrelated by the decorrelator 43 to provide three decorrelated signals that are mixed according to the augmentation matrix A, which is represented by the box 42.

Figure 4:
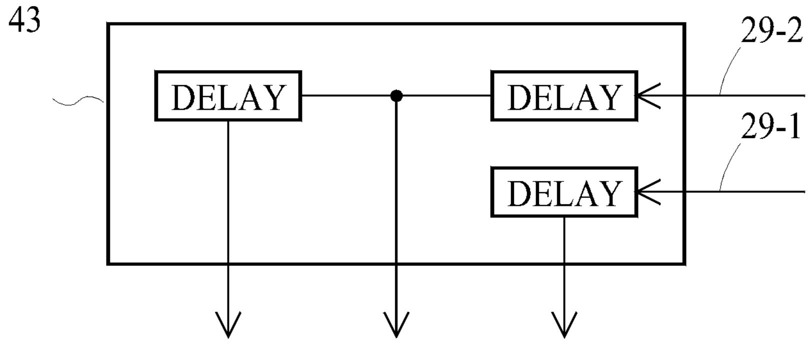
FIG. 4 is a schematic illustration of a signal decorrelator using delay components.

The decorrelator 43 may be implemented in a variety of ways. One implementation shown in FIG. 4 achieves psychoacoustic decorrelation by delaying its input signals by different amounts. Delays in the range from one to twenty milliseconds are suitable for many applications.

Figure 5:
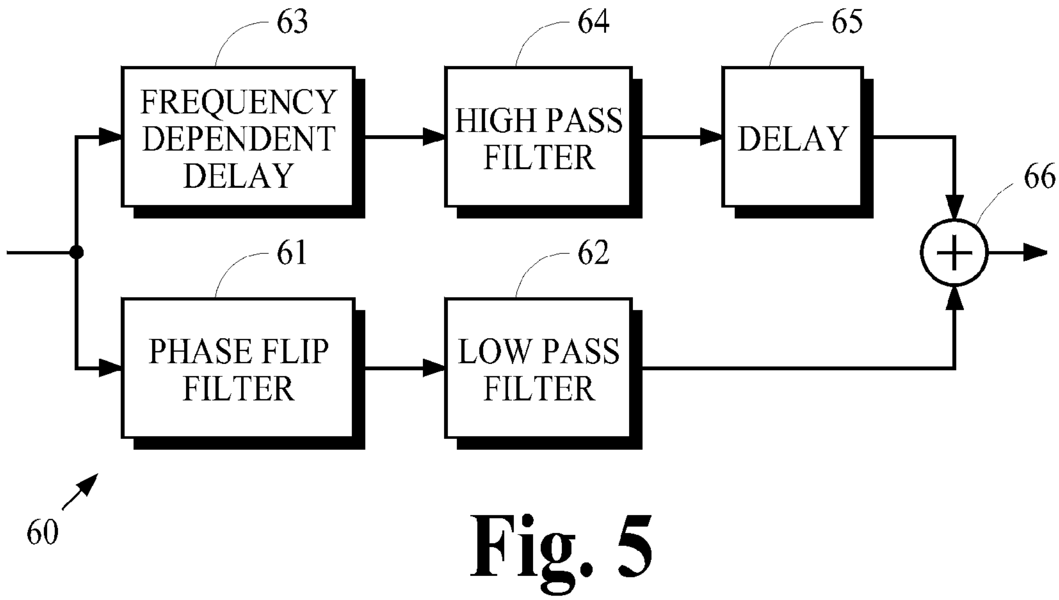
FIG. 5 is a schematic illustration of a signal decorrelator using a subband filter with a bimodal frequency-dependent change in phase and a subband filter with a frequency-dependent delay.

A portion of another implementation of the decorrelator 43 is shown in FIG. 5. This portion processes one of the intermediate input signals. An intermediate input signal is passed along two different signal-processing paths that apply filters to their respective signals in two overlapping frequency subbands. The lower-frequency path includes a phase-flip filter 61 that filters its input signal in a first frequency subband according to a first impulse response and a low pass filter 62 that defines the first frequency subband. The higher-frequency path includes a frequency-dependent delay 63 implemented by a filter that filters its input signal in a second frequency subband according to a second impulse response that is not equal to the first impulse response, a high pass filter 64 that defines the second frequency subband and a delay component 65. The outputs of the delay 65 and the low pass filter 62 are combined in the summing node 66. The output of the summing node 66 is a signal that is psychoacoustically decorrelated with respect to the intermediate input signal.

The phase response of the phase-flip filter 61 is frequency-dependent and has a bimodal distribution in frequency with peaks substantially equal to positive and negative ninety-degrees. An ideal implementation of the phase-flip filter 61 has a magnitude response of unity and a phase response that alternates or flips between positive ninety degrees and negative ninety degrees at the edges of two or more frequency bands within the passband of the filter. A phase-flip may be implemented by a sparse Hilbert transform that has an impulse response shown in the following expression:

$$H_S(k) = \begin{cases} 2/k'\pi & \{\text{odd } k' = k/S\} \\ 0 & \{\text{otherwise}\} \end{cases} \tag{9}$$

The impulse response of the sparse Hilbert transform should be truncated to a length selected to optimize decorrelator performance by balancing a tradeoff between transient performance and smoothness of the frequency response.

The number of phase flips is controlled by the value of the S parameter. This parameter should be chosen to balance a tradeoff between the degree of decorrelation and the impulse response length. A longer impulse response is required as the S parameter value increases. If the S parameter value is too small, the filter provides insufficient decorrelation. If the S parameter is too large, the filter will smear transient sounds over an interval of time sufficiently long to create objectionable artifacts in the decorrelated signal.

The ability to balance these characteristics can be improved by implementing the phase-flip filter 21 to have a non-uniform spacing in frequency between adjacent phase flips, with a narrower spacing at lower frequencies and a wider spacing at higher frequencies. Preferably, the spacing between adjacent phase flips is a logarithmic function of frequency.

The frequency dependent delay 63 may be implemented by a filter that has an impulse response equal to a finite length sinusoidal sequence h[n] whose instantaneous frequency decreases monotonically from π to zero over the duration of the sequence. This sequence may be expressed as:

$$h[n]=G\sqrt{|\omega'(n)|}\cos(\phi(n)),\ \text{for } 0\le n<L \tag{10}$$

where ω(n)=the instantaneous frequency;

ω'(n)=the first derivative of the instantaneous frequency;

G=normalization factor;

$\phi(n)=\int_0^n \omega(t)dt$=instantaneous phase; and

L=length of the delay filter.

The normalization factor G is set to a value such that:

$$\sum_{n=0}^{L-1} h^2[n] = 1 \tag{11}$$

A filter with this impulse response can sometimes generate "chirping" artifacts when it is applied to audio signals with transients. This effect can be reduced by adding a noise-like term to the instantaneous phase term as shown in the following expression:

$$h[n]=G\sqrt{|\omega'(n)|}\cos(\phi(n)+N(n)),\ \text{for } 0\le n<L \tag{12}$$

If the noise-like term is a white Gaussian noise sequence with a variance that is a small fraction of π, the artifacts that are generated by filtering transients will sound more like noise rather than chirps and the desired relationship between delay and frequency is still achieved.

The cut off frequencies of the low pass filter 62 and the high pass filter 64 should be chosen to be approximately 2.5 kHz so that there is no gap between the passbands of the two filters and so that the spectral energy of their combined outputs in the region near the crossover frequency where the passbands overlap is substantially equal to the spectral energy of the intermediate input signal in this region. The amount of delay imposed by the delay 65 should be set so that the propagation delay of the higher-frequency and lower-frequency signal processing paths are approximately equal at the crossover frequency.

The decorrelator may be implemented in different ways. For example, either one or both of the low pass filter 62 and the high pass filter 64 may precede the phase-flip filter 61 and the frequency-dependent delay 63, respectively. The delay 65 may be implemented by one or more delay components placed in the signal processing paths as desired.

Additional details of implementation may be obtained from international patent application no. PCT/US2009/058590 entitled "Decorrelator for Upmixing Systems" by McGrath et al., which was filed on Sep. 28, 2009.

D. Preferred Derivation Method

A preferred method for deriving the augmentation matrix A begins by creating a "seed matrix" P. The seed matrix P contains initial estimates for the coefficients of the augmentation matrix A. Columns are selected from the seed matrix P to form an interim matrix Q. The interim matrix Q is used to form a second interim matrix R. Columns of coefficients are extracted from interim matrix R to obtain the augmentation matrix A. A method that can be used to create the seed matrix P is described below after describing a procedure for forming the interim matrix Q, the interim matrix R and the augmentation matrix A.

1. Derivation of the Augmentation Matrix A

The basic inverse matrix B described above has M rows and N columns. A seed matrix P is created that has M rows and K columns, where 1≤K≤(M−N). The matrix B and the seed matrix P are concatenated horizontally to form an interim matrix Q that has M rows and N+K columns. This concatenation may be expressed as:

$$Q=[B|P] \tag{13}$$

The coefficients in each column j of the interim matrix Q are scaled so that they represent unit-magnitude vectors Q(j) in an M-dimensional space. This may be done by dividing the coefficients in each column by the magnitude of the vector they represent. The magnitude of each vector may be calculated from the square root of the sum of the squares of the coefficients in the column.

An interim matrix R having coefficients arranged in M rows and N+K columns is then obtained from the interim matrix Q. The coefficients in each column j of the interim matrix R represent a vector R(j) in an M-dimensional space. These column vectors are calculated by a process represented by the following pseudo code fragment:

```
(1)   R(1) = Q(1);
(2)   for j = 2 to K {
(3)       T( j ) = ( 1 − RR( j−1 ) * TRANSP[RR( j−1 )] ) * Q( j );
(4)       if MAG[T( j )] > 0.001 {
(5)           R( j ) = T( j ) / MAG[T( j )];
(6)       } else {
(7)           R( j ) = ZERO;
(8)       }
(9)   }
(10)  for j = 1 to K {
(11)      A( j )=R( j+N );
(12)  }
```

The statements in this pseudo code fragment have syntactical features similar to the C programming language. This code fragment is not intended to be a practical implementation but is intended only to help explain a process that can calculate the augmentation matrix A.

The notations R(j), Q(j), T(j) and A(j) represent column j of the interim matrix R, the interim matrix Q, a temporary matrix T and the augmentation matrix A, respectively.

The notation RR(j-1) represents a submatrix of the matrix R with M rows and j-1 columns. This submatrix comprises columns 1 through j-1 of the interim matrix R.

The notation TRANSP[RR(j-1)] represents a function that returns the transpose of the matrix RR(j-1). The notation MAG[T(j)] represents a function that returns the magnitude of the column vector T(j), which is the Euclidean norm of the coefficients in column j of the temporary matrix T.

Referring to the pseudo code fragment, statement (1) initializes the first column of the matrix R from the first column of the matrix Q. Statements (2) through (9) implement a loop that calculates columns 2 through K of the matrix R.

Statement (3) calculates column j of the temporary matrix T from submatrix RR and the interim matrix Q. As explained above, the submatrix RR(j-1) comprises the first j-1 columns of the interim matrix R. Statement (4) determines whether the magnitude of the column vector T(j) is greater than 0.001. If it is greater, then statement (5) sets the vector R(j) equal to the vector T(j) after it has been scaled to have a unit magnitude. If the magnitude of the column vector T(j) is not greater than 0.001, then the vector R(j) is set equal to a vector ZERO with all elements equal to zero.

Statements (10) through (12) implement a loop that obtains the M×K augmentation matrix A from the last K columns of the interim matrix R, which are columns N+1 to N+K. The column vectors in the augmentation matrix A are substantially orthogonal to each other as well as to the column vectors of the basic matrix B.

If the statement (4) determines that the magnitude of any column vector T(j) is not greater than 0.001, this indicates the vector T(j) is not sufficiently linearly independent of the column vectors Q(1) through Q(j-1) and the corresponding column vector R(j) is set equal to the ZERO vector. If any of the column vectors R(j) for $N<j\le N+K$ is equal to the ZERO vector, then the corresponding column P(j) of the seed matrix is not linearly independent of its preceding columns. This latter situation is corrected by obtaining a new column P(j) for the seed matrix P and performing the process again to derive another augmentation matrix A.

a) Selection of the Seed Matrix P

The M×K seed matrix P may be created in a variety of ways. Two ways are described in the following paragraphs.

The first way creates the seed matrix by generating an M×K array of coefficients having pseudo-random values.

A second way generates a seed matrix with coefficients that account for symmetries in the anticipated location of the acoustic transducers that will be used to reproduce the sound field represented by the intermediate output signals. This may be done by temporarily reordering the columns of the seed matrix during its creation.

For example, the five-channel matrix described above generates signals for channels listed in order as L, C, R, LS and RS. The anticipated symmetries of loudspeaker placement for this particular set of channels can be utilized more easily by rearranging the channels in order according to the azimuthal location of their respective acoustic transducer. One suitable order is LS, L, C, R and RS, which places the center channel C in the middle of the set.

Using this order, a set of candidate vectors can be constructed that have appropriate symmetry. One example is shown in Table I, in which each vector is shown in a respective row of the table. The transpose of these vectors will be used to define the columns of the seed matrix P.

TABLE I

| | LS | L | C | R | RS |
|---|---|---|---|---|---|
| Even function FE1 | 0 | 0 | 1 | 0 | 0 |
| Even function FE2 | 0 | 1 | 0 | 1 | 0 |
| Even function FE3 | 1 | 0 | 0 | 0 | 1 |
| Odd function FO1 | 0 | −1 | 0 | 1 | 0 |
| Odd function FO2 | 1 | 0 | 0 | 0 | −1 |

Each of the rows in the table have either even or odd symmetry with respect to the column for the center channel. A total of K vectors are chosen from the table, transposed and used to form an initial matrix P'. For example, if K=3 and the vectors are chosen for functions FE1, FE2 and FO1, then the initial matrix P' is:

$$P' = \begin{bmatrix} 0 & 0 & 0 \\ 0 & 1 & -1 \\ 1 & 0 & 0 \\ 0 & 1 & 1 \\ 0 & 0 & 0 \end{bmatrix} \quad (14)$$

The order of the elements of the vectors are then changed to conform to the channel order of the desired seed matrix P. This produces the following matrix:

$$P = \begin{bmatrix} 0 & 1 & -1 \\ 1 & 0 & 0 \\ 0 & 1 & 1 \\ 0 & 0 & 0 \\ 0 & 0 & 0 \end{bmatrix} \quad (15)$$

If this seed matrix P is used with the basic matrix B shown in expression 4, the interim matrix Q obtained by the process described above is:

$$Q = \begin{bmatrix} 0.65 & 0 & 0 & 1 & -1 \\ 0.40 & 0.40 & 1 & 0 & 0 \\ 0 & 0.65 & 0 & 1 & 1 \\ 0.60 & -0.24 & 0 & 0 & 0 \\ -0.24 & 0.60 & 0 & 0 & 0 \end{bmatrix} \quad (16)$$

The second interim matrix R formed from this matrix Q is:

$$R = \begin{bmatrix} 0.6500 & 0 & -0.3747 & 0.3426 & -0.5592 \\ 0.4000 & 0.0839 & 0.7957 & 0 & 0 \\ 0 & 0.4549 & -0.3747 & 0.3426 & 0.5592 \\ 0.6000 & -0.1646 & -0.2075 & -0.6186 & 0.4327 \\ -0.2400 & 0.5740 & -0.2075 & -0.6186 & -0.4327 \end{bmatrix} \quad (17)$$

The augmented matrix A obtained from this interim matrix R is:

$$A = \begin{bmatrix} -0.3747 & 0.3426 & -0.5592 \\ 0.7957 & 0 & 0 \\ -0.3747 & 0.3426 & 0.5592 \\ -0.2075 & -0.6186 & 0.4327 \\ -0.2075 & -0.6186 & -0.4327 \end{bmatrix} \quad (18)$$

E. Implementation

Figure 6:
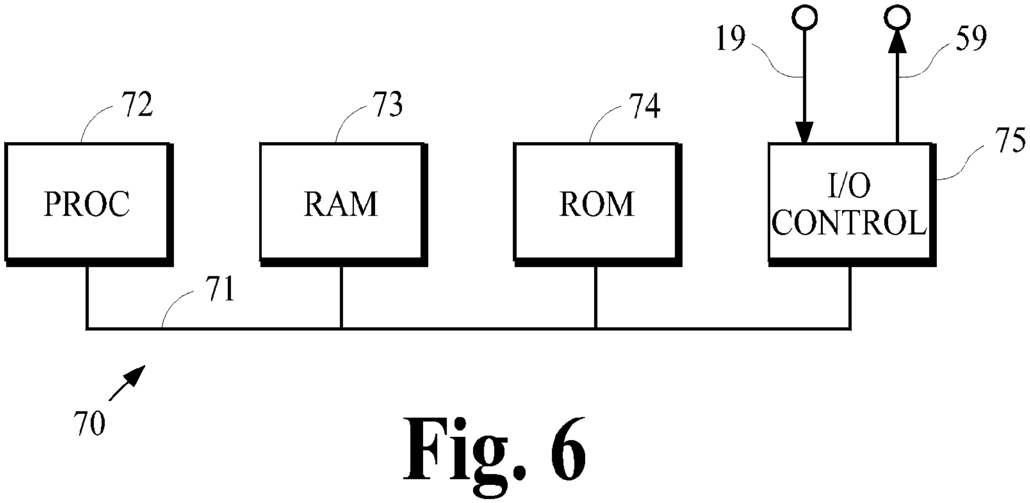
FIG. 6 is a schematic block diagram of a device that may be used to implement various aspects of the present invention.

Devices that incorporate various aspects of the present invention may be implemented in a variety of ways including software for execution by a computer or some other device that includes more specialized components such as digital signal processor (DSP) circuitry coupled to components similar to those found in a general-purpose computer. FIG. 6 is a schematic block diagram of a device 70 that may be used to implement aspects of the present invention. The processor 72 provides computing resources. RAM 73 is system random access memory (RAM) used by the processor 72 for processing. ROM 74 represents some form of persistent storage such as read only memory (ROM) for storing programs needed to operate the device 70 and possibly for carrying out various aspects of the present invention. I/O control 75 represents interface circuitry to receive and transmit signals by way of the communication signal paths 19, 59. In the embodiment shown, all major system components connect to the bus 71, which may represent more than one physical or logical bus; however, a bus architecture is not required to implement the present invention.

In embodiments implemented by a general purpose computer system, additional components may be included for interfacing to devices such as a keyboard or mouse and a display, and for controlling a storage device having a storage medium such as magnetic tape or disk, or an optical medium. The storage medium may be used to record programs of instructions for operating systems, utilities and applications, and may include programs that implement various aspects of the present invention.

The functions required to practice various aspects of the present invention can be performed by components that are implemented in a wide variety of ways including discrete logic components, integrated circuits, one or more ASICs and/or program-controlled processors. The manner in which these components are implemented is not important to the present invention.

Software implementations of the present invention may be conveyed by a variety of machine readable media such as baseband or modulated communication paths throughout the spectrum including from supersonic to ultraviolet frequencies, or storage media that convey information using essentially any recording technology including magnetic tape, cards or disk, optical cards or disc, and detectable markings on media including paper.

The invention claimed is:

1. A method performed by a device for deriving M output audio signals from one or more input audio signals, the method comprising:

receiving the one or more input audio signals;

analyzing the one or more input audio signals to derive one or more non-diffuse audio signals and N diffuse audio signals, wherein M is greater than N and is greater than two;

processing the one or more non-diffuse audio signals to derive M processed non-diffuse audio signals;

deriving K intermediate audio signals from the N diffuse audio signals such that each of the K intermediate audio signals is psychoacoustically decorrelated with each of the N diffuse audio signals and, if K is greater than one, is psychoacoustically decorrelated with all other of the K intermediate audio signals, wherein K is greater than or equal to one and is less than or equal to M−N;

mixing the N diffuse audio signals and the K intermediate audio signals to derive M diffuse audio signals, wherein the mixing is performed according to a system of linear equations with coefficients of a matrix that specify a set of N+K vectors in an M-dimensional space, and wherein at least K of the N+K vectors are substantially orthogonal to all other vectors in the set of N+K vectors; and combining the M processed non-diffuse audio signals and the M diffuse audio signals to generate the M output audio signals.

2. The method of claim 1, wherein each of the K intermediate audio signals is derived by delaying one of the N diffuse audio signals.

3. The method of claim 1, wherein one of the K intermediate audio signals is derived by:

filtering one of the N diffuse audio signals according to a first impulse response in a first frequency subband to obtain a first subband signal with a frequency-dependent change in phase having a bimodal distribution in frequency with peaks substantially equal to positive and negative ninety-degrees, and according to a second impulse response in a second frequency subband to obtain a second subband signal with a frequency-dependent delay, wherein:

the second impulse response is not equal to the first impulse response, the second frequency subband includes frequencies that are higher than frequencies included in the first frequency subband, and the first frequency subband includes frequencies that are lower than frequencies included in the second frequency subband; and combining the first subband signal and the second subband signal.

4. The method of any one of claims 1 through 3 where N is greater than one.

5. The method of any one of claims 1 through 3 where:

the matrix comprises a first submatrix of coefficients for N vectors, and a second submatrix of coefficients for K vectors;

the first submatrix of coefficients correspond to a result of scaling a third submatrix of coefficients by a first scale factor β;

the second submatrix of coefficients correspond to a result of scaling a fourth submatrix of coefficients by one or more second scale factors α;

the N diffuse audio signals are mixed according to a system of linear equations with the coefficients of the first submatrix; and the K intermediate audio signals are mixed according to a system of linear equations with the coefficients of the second submatrix.

6. The method of claim 5, wherein:

the second submatrix of coefficients correspond to the result of scaling the fourth submatrix of coefficients by one second scale factor α; and the first scale factor and the second scale factor are chosen so that the Frobenius norm of the matrix is within 10% of the Frobenius norm of the third submatrix; and $$\alpha = \sqrt{\frac{N \cdot (1 - \beta^2)}{K}}.$$

7. The method of claim 1, wherein processing the one or more non-diffuse audio signals comprises upmixing.

8. An apparatus comprising:

one or more input terminals for receiving input signals;

one or more output terminals for transmitting output signals;

one or more memory elements;

a storage medium recording one or more programs of instructions; and processing circuitry, coupled to the one or more input terminals, the one or more output terminals, the one or more memory elements, and the storage medium, for executing the one or more programs of instructions, wherein the one or more programs of instructions cause the processing circuitry to perform a method for deriving M output audio signals from one or more input audio signals, the method comprising:

receiving, by the one or more input terminals, the one or more input audio signals;

analyzing, by the processing circuitry, the one or more input audio signals to derive one or more non-diffuse audio signals and N diffuse audio signals, wherein M is greater than N and is greater than two;

processing, by the processing circuitry, the one or more non-diffuse audio signals to derive M processed non-diffuse audio signals;

deriving, by the processing circuitry, K intermediate audio signals from the N diffuse audio signals such that each of the K intermediate audio signals is psychoacoustically decorrelated with each of the N diffuse audio signals and, if K is greater than one, is psychoacoustically decorrelated with all other of the K intermediate audio signals, wherein K is greater than or equal to one and is less than or equal to M−N;

mixing, by the processing circuitry, the N diffuse audio signals and the K intermediate audio signals to derive M diffuse audio signals, wherein the mixing is performed according to a system of linear equations with coefficients of a matrix that specify a set of N+K vectors in an M-dimensional space, and wherein at least K of the N+K vectors are substantially orthogonal to all other vectors in the set of N+K vectors;

combining, by the processing circuitry, the M processed non-diffuse audio signals and the M diffuse audio signals to generate the M output audio signals; and transmitting, by the one or more output terminals, the M output audio signals.

9. The apparatus of claim 8, wherein each of the K intermediate audio signals is derived by delaying one of the N diffuse audio signals.

10. The apparatus of claim 8, where N is greater than one.

11. The apparatus of claim 8, wherein processing the one or more non-diffuse audio signals comprises upmixing.

12. A non-transitory medium recording a program of instructions, wherein the program of instructions is executable by a device to perform a method for deriving M output audio signals from one or more input audio signals, the method comprising:

receiving the one or more input audio signals;

analyzing the one or more input audio signals to derive one or more non-diffuse audio signals and N diffuse audio signals, wherein M is greater than N and is greater than two;

processing the one or more non-diffuse audio signals to derive M processed non-diffuse audio signals;

deriving K intermediate audio signals from the N diffuse audio signals such that each of the K intermediate audio signals is psychoacoustically decorrelated with each of the N diffuse audio signals and, if K is greater than one, is psychoacoustically decorrelated with all other of the K intermediate audio signals, wherein K is greater than or equal to one and is less than or equal to M−N;

mixing the N diffuse audio signals and the K intermediate audio signals to derive M diffuse audio signals, wherein the mixing is performed according to a system of linear equations with coefficients of a matrix that specify a set of N+K vectors in an M-dimensional space, and wherein at least K of the N+K vectors are substantially orthogonal to all other vectors in the set of N+K vectors; and combining the M processed non-diffuse audio signals and the M diffuse audio signals to generate the M output audio signals.

13. The non-transitory medium of claim 12, wherein each of the K intermediate audio signals is derived by delaying one of the N diffuse audio signals.

14. The non-transitory medium of claim 12, wherein processing the one or more non-diffuse audio signals comprises upmixing.

* * * * *